3,278,297
PROCESS OF GASEOUS REDUCING LEAD OXIDE EMPLOYING AN AGENT TO MAINTAIN LEAD IN PARTICULATE FORM
Arthur Adler, Easton, Pa., assignor to Chas. Pfizer & Co., New York, N.Y., a corporation of Delaware
No Drawing. Filed Mar. 6, 1964, Ser. No. 350,076
10 Claims. (Cl. 75—77)

This invention is concerned with the production of powdered metals, and more particularly with an improved process for the production of lead powder by reduction of the oxides of lead.

A metal which melts at a temperature above the reduction temperature of its oxide can be readily produced in powder form by a solid state reduction of the oxide. This is not the case with lead, however, which melts at 328° C., below required reduction temperatures. Thus, the reduction of lead oxides is a solid-liquid state reaction which normally produces the metal in a mass form rather than as powder. Accordingly, lead powder has been produced in the past by atomization of elemental lead, or else as an impure byproduct of the manufacture of tetraethyl lead.

It has now been discovered that the direct production of lead powder by gaseous reduction of particulate lead oxide is feasible, provided that the oxide particles are protected by a coating which will maintain their discrete nature during and after the conversion to molten lead. Coatings found to confer this advantage are formed upon contacting lead oxide with certain acids, bases and salts. These include the mineral acids and their ammonium salts, alkanoic acids of 2 to 18 carbon atoms and their alkali metal salts, and alkali metal hydroxides. Particularly preferred for their effectiveness and low cost are hydrochloric, sulfuric and phosphoric acids, and sodium hydroxide.

In the case of the alkali metal hydroxides, this property is particularly surprising, since the treatment of by-product lead particles with sufficient sodium hydroxide to wet the surfaces has been considered to promote their melting and coalescence at the normal melting point of metallic lead, a phenomenon which would suggest the unsuitability of sodium hydroxide in the present process.

Many oxides of lead are available and may be employed in the novel process of the present invention. Thus, for example, one may employ massicotite, amorphous lead oxide, minium or lead suboxide. Especially preferred for ready availability at low price is litharge. Each of these oxides may be obtained in particulate form suitable for the new process, and it is especially preferred to employ a very fine particle size, e.g. up to about 10 microns in diameter. Litharge, for example, is available in various grades, the non-fumed variety ranging in particle size from about 1 to 10 microns, whereas fumed litharge is even finer, about 0.25–1.3 microns, and is especially suitable. Coarser oxides may be employed if desired, but these tend to produce coarser lead. The particle size and particle size distribution of the final lead powder appear to be at least in part a function of the particle size of the oxide powder employed. (Owing to its malleability, the lead product itself cannot of course be made finer by milling or grinding.)

While various modes of treating the oxide particle may be employed, it is usually best to form a slurry or paste with a solution of the coating substance, whether it be acid, base or salt. Although these substances are effective over a wide range of concentrations, they will usually be employed at levels between about 0.1 and 10%, and preferably 0.1–5%, based on the weight of the oxide, it being understood that this is calculated on an anhydrous basis. At levels much below 0.1%, the molten lead particles sometimes have a tendency to agglomerate, whereas levels substantially above 5% are usually unnecessary and may even tend to introduce trace impurities into the final product. Furthermore, at particularly high levels the protective coating sometimes tends to fracture during processing, thereby leading to the same objectionable agglomeration encountered when too little reactive substance is employed.

For the achievement of intimate contact between the lead oxide and the coating substance, the latter will preferably be employed as a solution or dispersion in a reaction-inert liquid vehicle, i.e. one which is free of adverse effect on the lead oxide and the coating substance. In most cases, water will be employed. However, with coating substances of very low water solubility, such as the higher alkanoic acids, an organic solvent, such as an alcohol or ether, will usually be more convenient and appropriate.

After the oxide has been contacted with the coating solution by stirring or blending in the standard manner, suitably in a mill, blender, or other conventional equipment, it is next dried and, if necessary, pulverized, preferably to a particle size of 325 mesh or finer. The oxide is now ready for reduction.

Any gaseous reducing agent may be employed, including such materials as hydrogen, carbon monoxide, dissociated ammonia, or other available reducing gases. As previously stated, it is necessary to effect the reduction at a temperature above the melting point of elemental lead, and best results have been obtained by reduction at temperatures between about 350 and 450° C., inclusive, although temperatures outside this range can also be used. The reduction may be carried out in conventional manner, with the treated lead oxide contained in shallow dishes in the usual way. Heating in contact with the reducing gas is continued until substantially all of the oxide particles have been converted to molten particles of elemental lead. The time required for the reaction is not long, frequently below 20 minutes, and a optimum periods are easily determined by experiment. At the conclusion, the reduction charge is permitted to cool to discrete fine lead particles of high purity, useful in metallurgy, in pigments, and in other applications where high quality lead powder is required.

The following examples are included for illustrative purposes and are not intended to limit the invention, the scope of which is defined in the appended claims.

*Example 1*

Sodium hydroxide, 8.7 g., is dissolved in 300 ml. water and combined with 1070 g. fumed litharge in a Waring Blendor. When the oxide has been thoroughly wetted it is dried by heating at 200° C. to a moisture content of 1% and then milled to pass a 50 mesh screen. The powder is then placed in reduction boats to a depth of a half inch, reduced at 420° C. in hydrogen for 10 minutes, and permitted to cool. Approximately a kilogram of fine lead powder is obtained.

Example 2

Lithium hydroxide, 60.4 g., is dissolved in 300 ml. water and combined with 1065.2 g. litharge. After drying for an hour at 225–250° C. the mixture is milled through a 325 U.S. standard mesh screen. The powder is then reduced in hydrogen at a depth of ¾ inch for 15 minutes at 625°, and cooled to obtain about a kilogram of fine lead powder. Substantially the same result is obtained when an equal weight of potassium hydroxide is substituted for the lithium hydroxide.

Example 3

856 g. litharge is milled one hour with a solution of 100 ml. 5% hydrochloric acid in 700 ml. water. After drying, the reaction product is milled to 325 mesh and reduced in hydrogen for 15 minutes at 450° C. to produce lead powder containing 0.13% chloride, 3.5% lead oxide, and 96.2% elemental lead.

Example 4

Litharge 1074 g., is ball-milled one hour with a solution of 27.5 ml. 7° Bé. sulfuric acid in 800 ml. water. The reaction mixture is then dried, milled throug 325 mesh and reduced in hydrogen at 350° C. to fine elemental lead. Substantially the same results are obtained when an equivalent proportion of massicotite, amorphous lead oxide or lead suboxide is substituted for litharge.

Example 5

Fumed litharge, 1074 g., is ball-milled one hour with a solution of 34.3 ml. 4.3° Bé. phosphoric acid in 800 ml. water. The reaction mixture is then dried and reduced to lead powder by heating in carbon monoxidehydrogen (water gas) at 450° C. Substantially the same results are achieved when an equivalent proportion of red lead (minium) is substituted for the litharge.

Example 6

Litharge, 1071 g., a ball-milled one hour with a solution of 7.6 g. ammonium chloride in 900 ml. water. The paste is then dried and reduced to fine lead powder in 15 minutes at 450° C. in hydrogen.

Example 7

A solution of 50.8 ml. 2.9° Bé. nitric acid in 800 ml. water is combined with 1074 g. litharge and processed to lead powder as in Example 6.

Example 8

Fumed litharge is blended intimately with 5% by weight of ammonium sulfate in the form of an aqueous solution. The oxide is then dried under vacuum, milled through a 325 mesh screen, and reduced to fine lead powder in hydrogen at 425° C. In the same way, a series of lead powders is successfully prepared, substituting for the ammonuim sulfate an equal weight of each of the coating substances listed below. (The alkanoic acids are employed in alcohol or ether solution instead of water.)

Monoammonium phosphate
Diammonium phosphate
Sodium propionate
Potassium isobutyrate
Perlargonic acid
Sodium laurate
Myristic acid
Palmitic acid
Sodium palmitate

Example 9

Following the procedure of the preceding examples, a series of lead powders is prepared employing fumed litharge and a variety of coating substances. The lead products are examined for purity and freedom from agglomerates, with results as follows:

| Coating Substance | Level [1] | Lead Product | |
|---|---|---|---|
| | | Percent Lead | Percent Agglomerates |
| Sodium hydroxide | 5 | [2] | 0 |
| Sodium acetate | 0.5 | [2] | 0 |
| Hydrochloric acid | 10. | [2] | 0 |
| Ammonium chloride | 0.5 | 96.9 | 0 |
| Sulfuric acid | 0.5 | 95.2 | 0 |
| Nitric acid | 0.5 | 96.8 | 0 |
| Phosphoric acid | 0.5 | 97.3 | 0 |
| Stearic acid | 0.5 | 97.7 | 0 |
| Sodium stearate | 0.5 | 97.8 | 0 |
| | 0.5 | 96.1 | 1.6 |

[1] Weight percent based on litharge.
[2] Not rested.

What is claimed is:

1. A process for the production of lead powder which comprises reduction of particulate lead oxide at a temperature above the melting point of lead with a gaseous reducing agent, said particles being protected against coalescence during said reduction with a coating formed upon contacting lead oxide with a substance selected from the group consisting of mineral acids and their ammonium salts, alkanoic acids of 2 to 18 carbon atoms and their alkali metal salts, and alkali metal hydroxides.

2. The process of claim 1 wherein said coating substance is hydrochloric acid.

3. The process of claim 1 wherein said coating substance is sulfuric acid.

4. The process of claim 1 wherein said coating substance is phosphoric acid.

5. The process of claim 1 wherein said coating substance is sodium hydroxide.

6. The process of claim 1 wherein said coating substance is employed at a level of from about 0.1 to 5% by weight of said oxide.

7. The process of claim 1 wherein said reduction is effected at a temperature between about 350 and 450° C.

8. The process of claim 1 wherein said oxide is fumed litharge.

9. A process for the production of lead powder which comprises the steps of contacting particulate lead oxide with a solution in a reaction-inert solvent of a substance selected from the group consisting of mineral acids and their ammonium salts, alkanoic acids of 2 to 18 carbon atoms and their alkali metal salts, and alkali metal hydroxides, said substance being present in a quantity equivalent to from about 0.1 to 5% by weight of said oxide, drying said so-treated oxide, pulverizing said dried oxide, and heating said pulverized oxide in a reducing atmosphere at a temperature above the melting point of lead until said oxide is substantially completely reduced to elemental lead.

10. A process for the production of lead powder which comprises the steps of contacting litharge with a solution in a reaction-inert solvent of a substance selected from the group consisting of mineral acids and their ammonium salts, alkanoic acids of 2 to 18 carbon atoms and their alkali metal salts, and alkali metal hydroxides, said substance being present in a quantity equivalent to from about 0.1 to 5% by weight of said litharge, drying said so-treated litharge by evaporation of said solvent, milling said dried litharge to a powder having a particle size of up to about 325 U.S. standard mesh, and heating said powder in hydrogen at a temperature between about 350 and 450° C. until said litharge is substantially completely reduced to elemental lead.

References Cited by the Examiner
UNITED STATES PATENTS

| | | | |
|---|---|---|---|
| 2,253,632 | 8/1941 | Lebedeff | 75—0.5 |
| 2,692,197 | 10/1954 | Denison | 75—0.5 |
| 2,785,061 | 3/1957 | Teichmann | 75—26 |

DAVID L. RECK, *Primary Examiner.*

N. F. MARKVA, *Assistant Examiner.*